US008869651B2

(12) United States Patent
Yeh

(10) Patent No.: US 8,869,651 B2
(45) Date of Patent: Oct. 28, 2014

(54) HARMONIC REDUCER WITH CLUTCH FUNCTION

(71) Applicant: Chun-Shen Yeh, Taipei (TW)

(72) Inventor: Chun-Shen Yeh, Taipei (TW)

(*) Notice: Subject to any disclaimer, the term of this patent is extended or adjusted under 35 U.S.C. 154(b) by 90 days.

(21) Appl. No.: 13/724,578

(22) Filed: Dec. 21, 2012

(65) Prior Publication Data

US 2014/0083245 A1 Mar. 27, 2014

(30) Foreign Application Priority Data

Sep. 26, 2012 (TW) .............................. 101218625 U

(51) Int. Cl.
*F16H 37/04* (2006.01)
*F16H 1/10* (2006.01)
*F16H 49/00* (2006.01)
*F16D 41/066* (2006.01)

(52) U.S. Cl.
CPC ................ *F16H 1/10* (2013.01); *F16H 49/001* (2013.01); *F16D 2041/0665* (2013.01)
USPC .......................................................... 74/640

(58) Field of Classification Search
CPC .......................... F16H 49/001; F16H 2049/003
USPC .......................................................... 74/640
See application file for complete search history.

(56) References Cited

U.S. PATENT DOCUMENTS

| 3,196,713 | A | * | 7/1965 | Robinson ........................ 74/640 |
| 4,216,677 | A | * | 8/1980 | Tuzson .......................... 74/17.8 |
| 5,642,645 | A | * | 7/1997 | Foley et al. ..................... 74/640 |
| 7,409,891 | B2 | * | 8/2008 | Takemura ....................... 74/640 |
| 7,421,990 | B2 | * | 9/2008 | Taye et al. ................. 123/90.17 |
| 7,752,939 | B2 | * | 7/2010 | Ono ........................... 74/490.03 |
| 7,819,041 | B2 | * | 10/2010 | Yamamori et al. .............. 74/640 |

FOREIGN PATENT DOCUMENTS

TW 101210934 U 11/2012

* cited by examiner

*Primary Examiner* — Ha D Ho
(74) *Attorney, Agent, or Firm* — Rabin & Berdo, P.C.

(57) ABSTRACT

A harmonic reducer with clutch function includes a circular spline, a mounting base, a flexspline and a wave generator. When a power source drives the wave generator to rotate in a first direction, a one-way clutch engages to lock the mounting base so as to deform the flexspline and hence rotate the circular spline in the first direction. When an external force is applied to the output shaft in the first direction, the mounting base is driven by the flexspline so the one-way clutch disposed thereon is disengaged by a force in a second direction. At this moment, the rotation speed of the wave generator is equal to zero relative to the flexspline, so the wave generator can be driven by the circular spline to rotate along with the flexspline, and the central axel of the wave generator can be driven to rotate as well.

2 Claims, 5 Drawing Sheets

HARMONIC REDUCER WITH CLUTCH FUNCTION

CROSS-REFERENCE TO RELATED APPLICATION

This application claims the priority of Taiwanese patent application No. 101218625, filed on Sep. 26, 2012, which is incorporated herewith by reference.

BACKGROUND OF THE INVENTION

1. Field of the Invention

The present invention relates to a harmonic reducer, more particularly, relates to a harmonic reducer that is fixed when being applied with a force in one direction, and is free to rotate when being applied with a force in another direction.

2. The Prior Arts

The harmonic reducer is a gear drive which uses flexible components to generate flexible mechanical wave to transmit power and motion. It is also called a "harmonic gear drive" (also known as the harmonic drive).

FIG. 1 shows a conventional harmonic reducer, which includes three components: a circular spline A with an internal gear, a flexspline B with an external gear and a wave generator C. When the harmonic drive functions as a reducer, the conventional type of operation is to set the circular spline A as stationary, the wave generator C as active operating and the flexspline B as the power output.

The flexspline B is a thin-walled gear, which has a greater range of elastic deformation, where the inner diameter is equal or slightly larger than the total outer diameter of the wave generator. The wave generator C is a component, which can elastically deform the flexspline B within a controllable range. The wave generator C includes a central axel, wherein the central axel is installed with a deformable rolling bearing to form a roller. The wave generator C is then assembled inside the flexspline B so the outer wall of the wave generator C and the inner wall of the flexspline B are abutted against each other. The wave generator C is connected to a power source, which is typically a motor. When the wave generator C is installed into the flexspline B, the flexspline is forced to deform from the round shape into an oval shape. The external gear on the two ends of the long axel of the oval are further pushed to be completely engaged with the internal gear of the circular spline A, whereas the external gear near the two ends of the short axel are completely disengaged with the internal gear of the circular spline. The rest of the external gear on other parts of the perimeter is in a transition state between engaged and disengaged. When the wave generator rotates continuously, the deformation of the flexspline also changes continuously, whereas the engaging state between the flexspline B and circular spline A also changes simultaneously. The engagement cycle starts from engaging in, engaged, engaging out, disengaged and then repeats onwards so the flexspline slowly rotates in the opposite direction of the wave generator C relative to the circular spline.

During the driving process, the number of times a point on flexspline B deforms during one revolution of the wave generator is defined as the wave number n. The most widely used drive type is the double wave drive due to its smaller flexspline stress, simpler structure and a greater drive ratio. The pitches of the gears in the flexspline and circular spline of the harmonic gear drive are the same, but the numbers of the gear teeth are not.

When the circular spline is fixed, the wave generator is rotated and the flexspline is driven to rotate. The drive ratio of the harmonic gear drive is equal to: $i=-B1/(A1-B1)$, where A1 and B1 are the number of gear teeth of the circular spline A and the flexspline B, respectively.

Because of the large number of the flexspline gear teeth, the harmonic gear drive has a large drive ratio.

Because of the surface contact between the gear tooth and the high number of simultaneously engaged gear teeth, the harmonic reducer has the advantages of a smaller load per unit area and a higher bearing capacity compared to other drive types during the harmonic drive process. The harmonic reducer also has the benefit of a large drive ratio, where the drive ratio of a single stage harmonic gear drive can be $i=70\sim500$. Furthermore, The harmonic reducer has the advantages of a small size, light weight, high drive efficiency, long service life, high stability, impact free, low noise and high motion accuracy; therefore, the harmonic reducer has a wide range of applications.

However, during the drive process of the reducer, the flexspline needs to endure a larger alternating load which causes the flexspline to be damaged easily. In this case, the required fatigue strength, and the required technique level of process and heat treatment of the flexspline material are higher. The processing technique is also more complex.

In addition, in the conventional harmonic reducer, the distance D between the output shaft and the engaging location of circular spline and flexspline is great, which can cause the sway due to different axel and the increase of heat and noise due to friction.

In order to solve the previous mentioned problems, Taiwan Patent application No. 101210934 filed by the present applicant disclosed a harmonic reducer, which has the wave generator thereof assembled with the flexspline and a power source, so the flexspline deforms and engages with the circular spline partially. The flexspline is fixed while the circular spline is connected to an output shaft. When the power source drives the wave generator to rotate, the flexspline also drives the circular spline and the output shaft to rotate simultaneously.

However, the flexspline of the harmonic reducer described above is mounted directly to the casing of the reducer or other components, so uneven internal stress easily occurs when the flexspline deforms during the driving process. In addition, the amount of deformation in the flexspline is also limited so the adjustment of the tooth difference between the circular spline and the flexspline is not allowed; therefore the need of a greater output range cannot be satisfied through various reduction ratios.

Furthermore, since the flexspline of the conventional harmonic reducer or the reducer disclosed by Taiwan Patent application No. 101210934 are usually disposed fixedly, the output shaft of the circular spline is limited by the resistance thereof, and thereby restricting the use of the harmonic reducer.

SUMMARY OF THE INVENTION

A primary objective of the present invention is to overcome the drawbacks of the general reducer with a fixed flexspline. The circular spline and the output shaft of such harmonic reducer are limited by the resistance from the flexspline, thereby restricting the use of the harmonic reducer.

The harmonic reducer with clutch function provided disclosed in the present invention is characterized in installing a one-way clutch on the flexspline with a mounting base, and driving the flexspline with the wave generator. With such configuration, when the power source drives the wave generator to rotate in a first direction, the one-way clutch engages to lock the mounting base, in the mean time, the flexspline also deforms to rotate the circular spline in the first direction, and the output shaft is then rotated in the same direction with the circular spline. When an external force is applied to the output shaft in the first direction which causes the rotation speed of the output shaft to be faster than the rotation speed of the circular spline, the output shaft drives the circular spline and causes the one-way clutch to disengage in a second direction, where the second direction is opposite from the first direction. The rotation speed of the wave generator is equal to zero relative to the flexspline, so the wave generator can be driven by the circular spline to rotate along with the flexspline.

The harmonic reducer provided by the present invention includes a circular spline, a mounting base, a flexspline and a wave generator. The circular spline has an inner wall defining an internal space, an internal gear composed of a plurality of internal gear teeth being formed circumferentially on the inner wall. The circular spline is connected to an output shaft. The mounting base has an annular body installed on an outer surface of the flexspline. The one-way clutch is disposed at an outer surface of the annular body. When the one-way clutch rotates in a first direction upon application of an external force, it engages and locks the mounting base. On the other hand, when the one-way clutch rotates in a second direction, it disengages from the mounting base. The flexspline is a thin-walled cylinder; an external gear composed of a plurality of external gear teeth is formed circumferentially on an outer surface thereof. The outer surface of the flexpspline is mounted to an inner surface of the annular body. The wave generator is assembled within an inner surface of the flexspline to deform the flexspline, and also to partially mesh the external gear with the internal gear. The wave generator is connected with a power source so as to be driven to rotate, and the wave generator further drives the circular spline and the output shaft to rotate simultaneously.

When an external force is applied to the output shaft in the first direction which causes the rotation speed of the output shaft to be faster than the rotation speed of the wave generator, the output shaft drives the circular spline to drive the flexspline, and then the mounting base is driven by the flexspline so the one-way clutch disposed thereon is disengaged by a force in a second direction. At this moment, the rotation speed of the wave generator is equal to zero relative to the flexspline, so the wave generator can be driven by the circular spline to rotate along with the flexspline, and the central axel of the wave generator can be driven to rotate as well.

In the present invention, a plurality of elastic wall sections are formed circumferentially on the inner surface of the annular body and are angularly spaced apart from one another and the outer surface of the flexspline is mounted to the inner surface of the annular body. With such configuration, the flexspline is flexible during the operating process.

The present invention utilizes the configuration where the outer surface of the flexspline is installed in the elastic wall sections of the annular body of the mounting base, and the flexspline is further engaged with the circular spline. In this way, no speed difference is resulted between the flexspline and the mounting base when the flexspline is driven to rotate by the wave generator, thus providing an additional stable support for the flexspline. In the present invention, the flexspline deforms but does not rotate. Different speed is resulted between the circular spline and the flexspline circular spline, so the rotation speed of the circular spline is reduced, and thus reducing the output speed of the output shaft.

The one-way clutch of the present invention can be an overrunning clutch, which includes: an outer ring, an inner ring with a plurality of ratchet on the outer surface thereof, a plurality of rollers, a plurality of springs and a plurality of ejector pins. The springs force the ejector pins to push the rollers into a wedge-shaped groove, which is formed between the ratchet and the inner surface of the outer ring. In this way, when the inner ring rotates in the first direction, the rollers are engaged tightly in the wedge-shaped groove and thus driving the outer ring to rotate. When the rotation speed of the outer ring is greater than the inner ring, the inner ring then rotates in the second direction which is opposite from the outer ring, so the rollers disengage from the wedge-shaped groove.

Notably, the one-way clutch can also be replaced by a one-way bearing to achieve the same effects and goals described above.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

An embodiment of the present invention will be described in details with reference to the drawings so that this disclosure is thorough and fully conveys the concept of the invention to those who skilled in the art.

Figure 1:
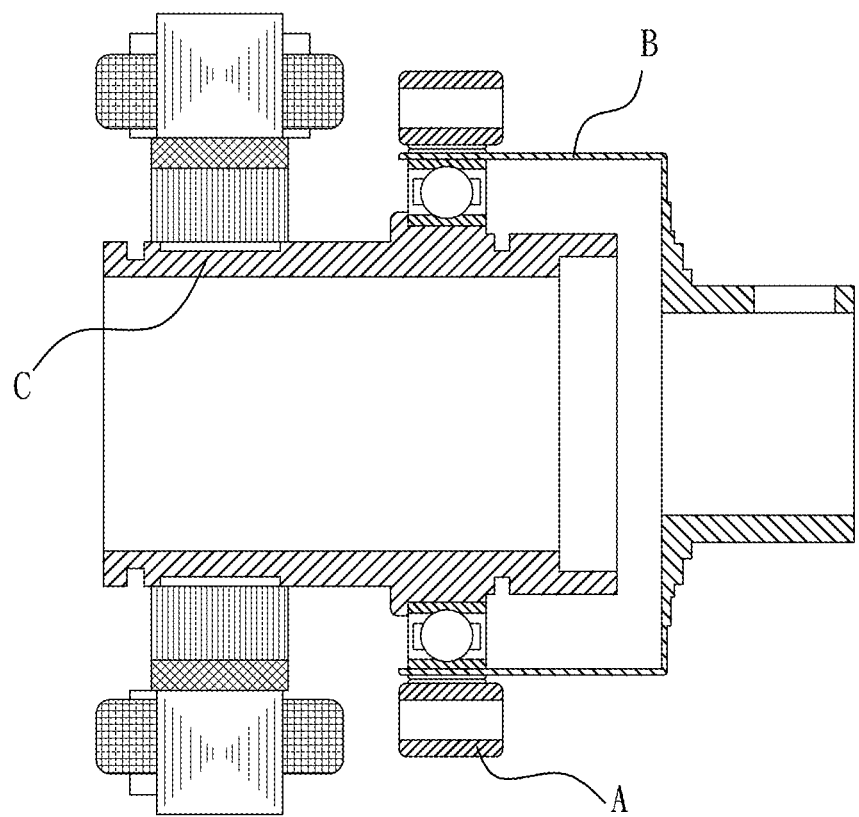
FIG. 1 is a plane section view showing the structure of a conventional harmonic reducer.
Figure 2:
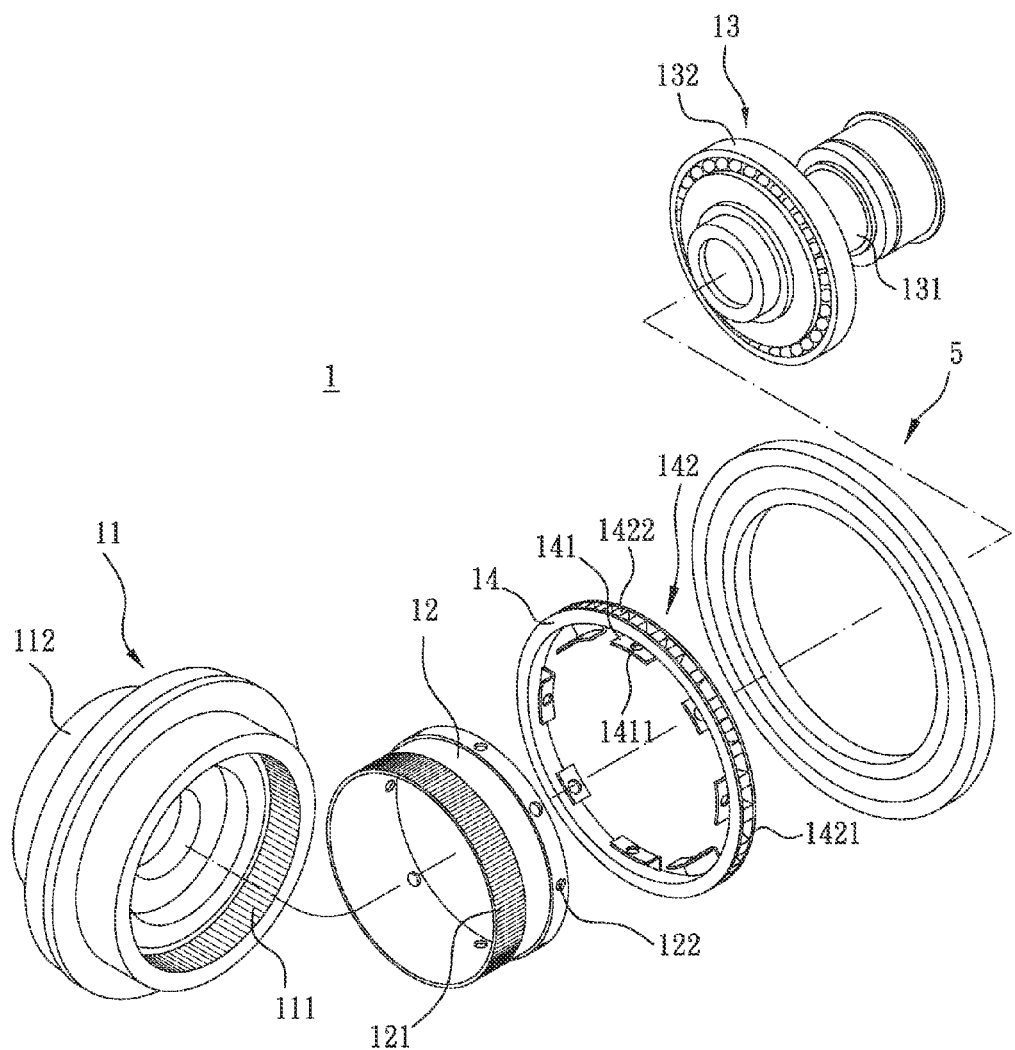
FIG. 2 is an exploded perspective view showing the assembling relations between each components of the harmonic reducer of the present invention.
Figure 3:
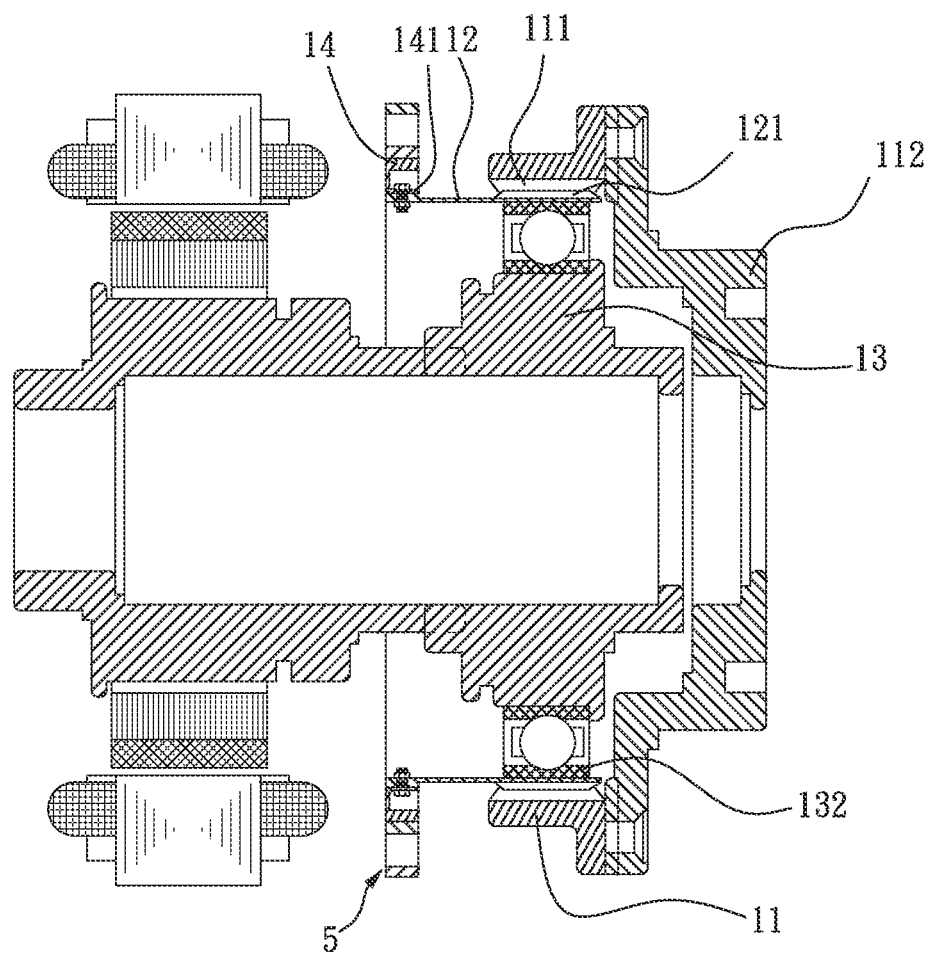
FIG. 3 is a plane section view showing the harmonic reducer of the present invention.

As shown in FIG. 2 and FIG. 3, the harmonic reducer 1 provided by the present invention includes: a circular spline 11, a flexspline 12, a wave generator 13 and a mounting base 14. The circular spline 11 has an inner wall defining an internal space, an internal gear 111 composed of a plurality of internal gear teeth is formed circumferentially on the an inner wall. The circular spline 11 is connected to an output shaft 112. In the preferred embodiment of the present invention, the output shaft 112 can be integrally formed at an end of the circular spline. A plurality of holes or screw holes can be disposed on the output shaft for installing other output devices.

The flexspline 12 can be manufactured into the precise shape and size with a tube material with suitable thickness. In this embodiment, the flexspline 12 is a thin-walled cylinder. A gear hobbing machine is then used to form the external gear 121 composed of a plurality of external gear tooth on an outer surface of the thin-walled cylinder. The outer surface of thin-walled cylinder 12 is further formed with a plurality of holes 122 at an end thereof.

Figure 5:
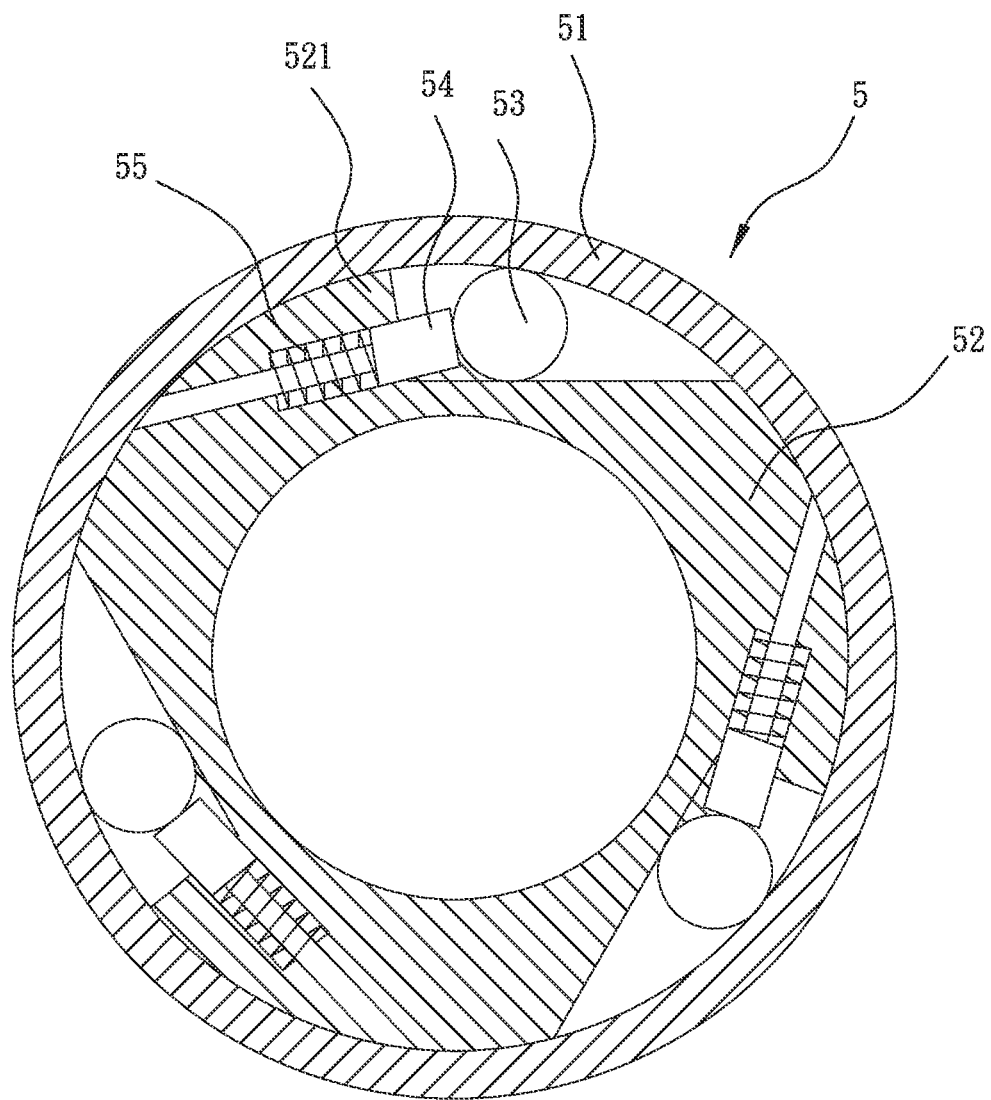
FIG. 5 is a plane schematic view showing one-way clutch employed in the harmonic reducer of the present invention.

The mounting base 14 has an annular body, where a plurality of elastic wall section 141 is formed circumferentially on an inner surface of the annular body. Preferably, each of the elastic wall sections 141 is an elastic strip processed by impact molding and placed in the inner surface of the mounting base 14. At least one perforation 1411 is reserved on the elastic strip, and then the elastic strip is bended until it is close to 90 degrees to form the elastic wall section 141 respectively. A one-way clutch 142 is installed at the outer surface of the annular body. As shown in FIG. 5, the one-way clutch 142 of the present invention can be an overrunning clutch 5, which includes: an outer ring 51, an inner ring 52 with a plurality of ratchet 521 on the outer surface thereof, a plurality of rollers 53, a plurality of ejector pins 54 and a plurality of springs 55. The springs 55 are installed in a groove of the inner ring 52, so that each spring 55 forces each ejector pin 54 to push the rollers 53 respectively into a wedge-shaped groove, which is formed between the ratchet 521 and the inner surface of the outer ring 51. In this way, when the inner ring 52 rotates in the first direction, the rollers 53 are engaged tightly in the wedge-shaped groove. When the outer ring 51 rotates in the second direction, the rollers 53 are disengaged from the wedge-shaped groove.

The wave generator 13 of the present invention is a deformable bearing which has a central axle 131 and an outer ring 132, wherein the central axle 131 is an oval which is close to a circle shape so the mutual rotation is allowed between the outer ring 132 and the central axle 131. The central axle 131 is connected to a power source (not shown in graph) which is generally a motor.

The assembling method of each components of the harmonic reducer 1 in the present invention will be described next. First, the outer surface of the flexspline 12 is assembled in the inner surface of the mounting base 14 which is surrounded by the elastic wall sections 141. Screws or other mounting members are next passed through the perforations 1411 in the elastic wall sections 141 and the holes 122 in the flexspline 12, to mount the flexspline 12 on the elastic wall sections 141 of the mounting base 14. In other words, the flexspline 12 is directly connected to the elastic wall sections 141, and the outer surface of the mounting base 14 is assembled to the inner surface of the inner ring 52 of the overrunning clutch 5. Next, flexspline is assembled in the internal space of the circular spline 11, and the wave generator 13 is installed onto the inner surface of the flexspline 12. The flexspline 12 is a thin-walled gear or cylinder which can be greater elastically deformed, and the inner diameter of the flexspline 12 is equal or slightly greater than the total outer diameter of the wave generator 13, while the wave generator 13 is a component which can deforms the flexspline elastically in a controllable range.

Figure 4:
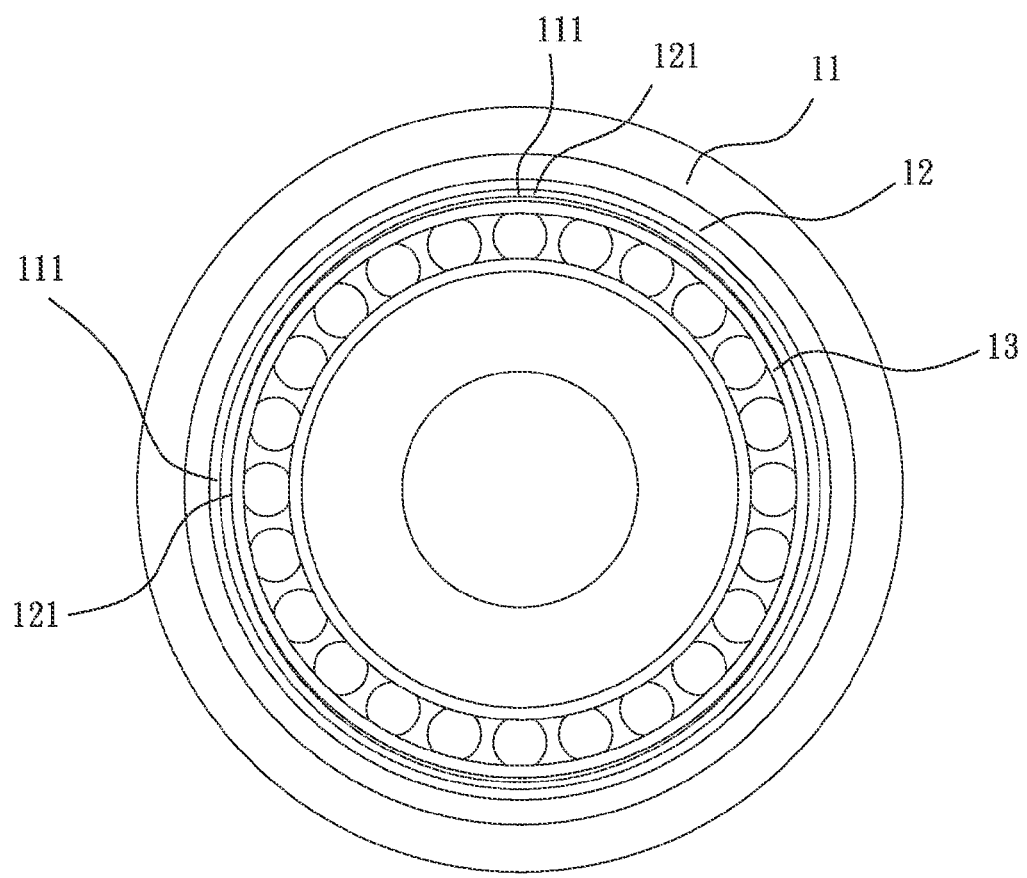
FIG. 4 is a plane schematic view showing one end of the harmonic reducer of the present invention.

When the wave generator 13 is installed into the flexspline 12, the ends of the flexspline 12 are forced from the circular shape into an oval shape (as shown in FIG. 4). The external gear 121 near the two ends of the long axel of the oval is further pushed and engages with the internal gear 111 of the circular spline 11 completely, whereas the external gear near the two ends of the short axel of the oval is completely disengaged with the internal gear of the circular spline. The rest of the external gear on the other parts of the surface is in a transition state between engaged and disengaged. When the wave generator 13 rotates continuously, the deformation of the flexspline 12 changes continuously, so the engaging status of flexspline 12 and circular spline 11 also changes constantly. The engagement cycle starts from engaging in, engaged, engaging out, disengaged and then repeats onwards so the circular spline 11 slowly rotates in the same direction of the wave generator 13 relative to the flexspline 12.

In the present invention, when the wave generator 13 is driven to rotate in the first direction (e.g. clockwise), the springs 55 force the ejector pins 54 to push the rollers 53 into a wedge-shaped groove, which is formed between the ratchet 521 and the inner surface of the outer ring 51. In this way, the flexspline 12 is immobilized, and the circular spline 11 and the output shaft 112 can rotate simultaneously and are driven by the flexspline 12. When an external force is applied to the output shaft 112 which causes the rotation speed of the output shaft 112 to be faster than the rotation speed of the wave generator 13, the output shaft 112 drives the circular spline 11 to drive the flexspline 12, and then the mounting base 14 is driven by the flexspline 12 so the inner ring 52 disposed at the mounting base 14 rotates in a second direction which is opposite from the first direction (e.g. counterclockwise). In this way, the rollers 53 are disengaged from the wedge-shaped groove which is formed between the ratchet 521 and the inner surface of the outer ring 51. At this moment, the rotation speed of the wave generator 13 is the same as the flexspline 12, so the wave generator 13 can be driven by the circular spline 11 to rotate along with the flexspline 12, and the central axle 131 of the wave generator 13 can be driven to rotate as well.

In addition, by mounting the flexspline 12 on the flexible elastic wall sections 141 of the mounting base 14, and engaging the flexspline 12 with the circular spline 11, there can be no difference rotation speed between the flexspline 12 and the mounting base 14 in the present invention when the flexspline 12 is driven to rotate by the wave generator 13. Additional stable support for the flexspline 12 can be provided through such configuration, so the flexspline 12 can be stationary while deformed. At the same time, a different rotation speed is resulted between flexspline 12 and circular spline 11 when the two engage each other, so the rotation speed of the circular spline 11 can be reduced to further reduce the output of the output shaft 112.

In the present invention, the one-way clutch 5 can be replaced by a one-way bearing (not shown) and also achieve the same functions and effects. The one-way bearing is a conventional and commonly used mechanical component; therefore, the structure of the one-way bearing will not be explained here in detail.

The harmonic reducer with clutch function of the present invention can be utilized in many fields. For example, when installed in an electric bicycle, the electricity provided by the bicycle can rotate the wave generator 13 in the first direction (clockwise) to engage the one-way clutch 142. The flexspline 12 deforms but does not rotate, so the output from the circular spline 11 and the output shaft 112 are reduced to move the bicycle forward. When the electricity is not provided, the bicycle rider can paddle to drive the output shaft 112 to further drive the circular spline 11. The circular spline then drives the flexspline 12 to rotate in an opposite second direction (counterclockwise), so the one-way clutch 142 is disengaged, and the mounting base is rotated by the flexspline 12. With the harmonic reducer with clutch function, the wave generator 13 can be connected to the rotor of the generator, so the wave generator can generate electricity at the same time. When the wave generator 13 is rotate reversely by human power and the battery is charged to refill its power.

The preferred embodiment described above is disclosed for illustrative purpose but to limit the modifications and variations of the present invention. Thus, any modifications and variations made without departing from the spirit and scope of the invention should still be covered by the scope of this invention as disclosed in the accompanying claims.

What is claimed is:
1. A harmonic reducer with clutch function, comprising:
a circular spline having an inner wall defining an internal space, an internal gear composed of a plurality of internal gear teeth being formed circumferentially on said inner wall, wherein said circular spline is connected to an output shaft;

a mounting base having an annular body;

a one-way clutch mounted on an outer surface of said annular body;

a flexspline, in form of a thin-walled cylinder, an external gear composed of a plurality of external gear teeth formed circumferentially on an outer surface of said thin-walled cylinder, wherein said outer surface of said thin-walled cylinder is mounted to an inner surface of said annular body of said mounting base; and a wave generator assembled within an inner surface of said thin-walled cylinder so as to deform said thin-walled cylinder, where said external gear of said thin-walled cylinder partially meshes with said internal gear of said circular spline; wherein said wave generator is connected with a power source so as to be driven thereby, which, in turn, causes said circular spline and said output shaft to rotate simultaneously.

2. The harmonic reducer with clutch function as claimed in claim 1, wherein a plurality of elastic wall sections are formed circumferentially on said inner surface of said annular body and angularly spaced from one another with said outer surface of said thin-wall cylinder mounted to said elastic wall sections of said annular body so that when said thin-walled cylinder is driven to rotate by said wave generator, no speed difference is resulted between said thin-walled cylinder of said flexspline and said annular body of said mounting base but speed difference is resulted between said circular spline and said thin-walled cylinder of said flexspline, thereby decreasing rotation speed of said circular spline.

* * * * *